United States Patent
Helbling et al.

(10) Patent No.: US 8,311,199 B2
(45) Date of Patent: Nov. 13, 2012

(54) METHODS AND SYSTEMS FOR CONFIGURING AND PROVIDING CONFERENCE CALLS WITH CUSTOMIZED CALLER ID INFORMATION

(75) Inventors: Christopher L. Helbling, Norwalk, CT (US); Craig L. Reding, Midland Park, NJ (US); Paula Ann Dromlewicz, Jefferson, MA (US); John Reformato, Tarrytown, NY (US)

(73) Assignees: Verizon Services Corp., Ashburn, VA (US); Verizon Data Services LLC, Temple Rerrace, FL (US)

( * ) Notice: Subject to any disclaimer, the term of this patent is extended or adjusted under 35 U.S.C. 154(b) by 1202 days.

(21) Appl. No.: 11/616,922

(22) Filed: Dec. 28, 2006

(65) Prior Publication Data

US 2008/0159503 A1 Jul. 3, 2008

(51) Int. Cl.
H04M 3/42 (2006.01)

(52) U.S. Cl. .............................. 379/202.01; 379/207.13

(58) Field of Classification Search .................. 379/202, 379/207.13, 202.02–206.01, 93.21
See application file for complete search history.

(56) References Cited

U.S. PATENT DOCUMENTS

| 6,798,753 | B1 * | 9/2004 | Doganata et al. | 370/260 |
| 7,280,646 | B2 * | 10/2007 | Urban et al. | 379/142.01 |
| 2007/0288562 | A1 * | 12/2007 | Shaffer et al. | 709/204 |

* cited by examiner

*Primary Examiner* — Curtis Kuntz
*Assistant Examiner* — Amal Zenati

(57) ABSTRACT

Methods and systems for automatically providing conference calls are disclosed. In one aspect, methods and systems detect a conference call event that was previously configured by a subscriber user and identify participant users associated with the conference call event. In another aspect, when configuring a conference call event, a subscriber user may enter, select or otherwise designate conference information that the user wishes to be displayed in the caller identification fields that are sent out when a bridge dials the participant users associated with the conference call. Once identified, each participant user is contacted and a response is received from each of the users. Based on the received responses, a conference call is established between the participant users and the subscriber user.

17 Claims, 9 Drawing Sheets

METHODS AND SYSTEMS FOR CONFIGURING AND PROVIDING CONFERENCE CALLS WITH CUSTOMIZED CALLER ID INFORMATION

BACKGROUND INFORMATION

A wide variety of means exist for communication between users. For example, a user may conduct phone calls via a home phone, work phone, and mobile phone. Users may also communicate using devices such as Personal Computers ("PC's"), Personal Digital Assistants ("PDA's"), pagers, etc. using different types of messaging services, such as e-mail and instant messaging.

The types of communications between users also vary. Users may communicate between each other individually or a group of users (e.g., three or more users) may communicate simultaneously through a conference call. There are different mechanisms for configuring a conference call between a group of users. Some conventional telecommunication systems configure a conference call by adding users to an established call one at a time. Alternatively, conventional systems configure a conference call by allowing members of a conference call group to call in to a common location (e.g., a bridge). Other conventional systems, on the other hand, allow a user to instruct a network to contact users included on a predetermined list to establish a conference call between the users.

Although current mechanisms enable users to configure and establish conference calls, they each require at least one user to initiate the configuration of the call at the time the conference call is to take place. Accordingly, there is a need for a system and method for automatically establishing a conference call between participant users.

BRIEF DESCRIPTION OF THE SEVERAL VIEWS OF THE DRAWING(S)

The accompanying drawings, which are incorporated in and constitute a part of this specification, illustrate at least one preferred embodiment of the invention and, together with the description, serve to explain the principles consistent with other exemplary embodiments.

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Methods and systems consistent with certain aspects of exemplary embodiments may automatically set up and maintain conference calls between an initiating user and participant users. The initiating user may schedule a conference call event with a service center by identifying a time and date of a future conference call and any participant users that are to be included in the call. The service center scans a data structure associated with a calendar of events for the conference call event, and when the event is detected, the service center provides instructions to a conference bridge that initiates a call to each participant user identified by the initiating user. Each participant user may accept or reject the call through one or more feedback options made available by the conference bridge. Once a call is accepted by a participant user, the conference bridge facilitates the conference call between the initiating user and any participant users that have accepted the call. The conference bridge may also leverage a speech recognition server to create a transcript of any communications during the conference call that is provided to the initiating user following termination of the conference call.

Figure 1:
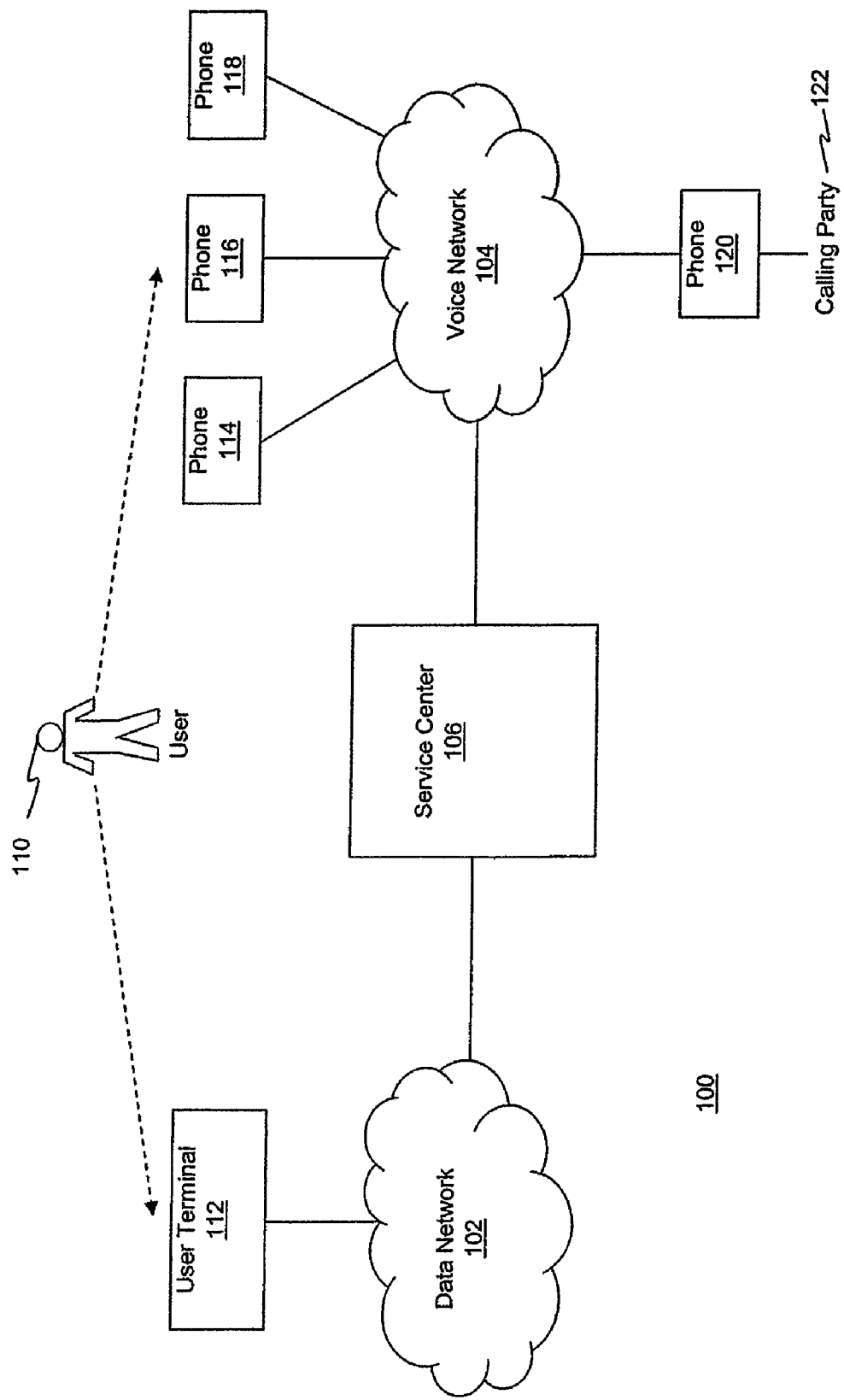
FIG. 1 is a diagram of an exemplary data processing and telecommunications environment consistent with exemplary embodiments.

FIG. 1 is a block diagram of a data processing and telecommunications environment 100, in which features and aspects consistent with exemplary embodiments may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. Calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a Wide Area Network ("WAN"), Local Area Network ("LAN"), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented on a voice over broadband network, such as a network using voice-over Internet Protocol ("VoIP") technology. Additionally, in other embodiments, the voice network may be a video over broadband network, such as, for example, a network for providing 2-way video communications. In another example, the voice network may be a wireless broadband network, such as, for example, a network using WiFi (such as, but not limited to, IEEE 802.11(B), (G), or (N)) or WiMAX. In yet another example, voice network 104 may be a wireless voice network(s), such as, for example, a cellular or third-generation (3G) cellular network. In addition, voice network 104 may be implemented using any single or combination of the above-described technologies consistent with the principles of exemplary embodiments. Further, service center 106 may be connected to multiple voice networks 104, such as for example, the voice networks provided by Verizon, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the "Blackberry" device from Research in Motion or the "Treo" device from Palm. Furthermore, user terminal 112 may be implemented in wireless devices, such as pagers, mobile phones (with data access functions), and Personal Digital Assistants ("PDAs") with network connections.

User terminal 112 also allows user 110 to communicate with service center 106. For example, user 110 may use Instant Messaging ("IM") to communicate with service center 106. In addition, user terminal 112 may use other aspects of TCP/IP including the Hypertext Transfer Protocol ("HTTP"); the User Datagram Protocol ("UDP"); the File Transfer Protocol ("FTP"); the Hypertext Markup Language ("HTML"); and the eXtensible Markup Language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a Private Branch Exchange ("PBX"), may be interposed between phones 114, 116, 118, and 122 and voice network 104.

Figure 2:
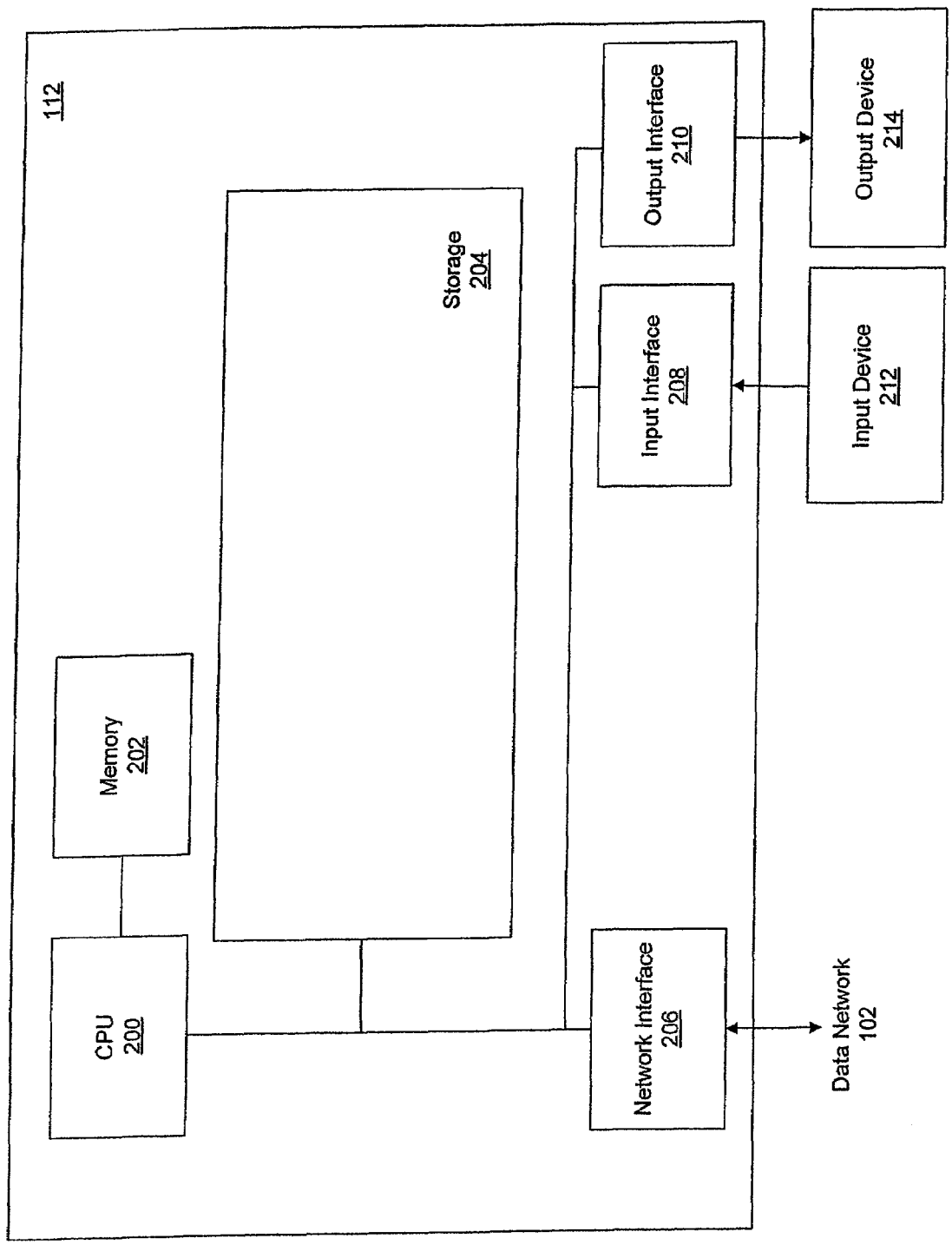
FIG. 2 is a diagram of an exemplary user terminal, consistent with exemplary embodiments.

FIG. 2 is a block diagram of a user terminal consistent with exemplary embodiments. User terminal 112 may include a Central Processing Unit ("CPU") 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium processor provided from Intel Corporation.

Memory 202 provides a primary memory for CPU 200, such as for program code. Memory 202 may be embodied with a variety of components of subsystems, including a Random Access Memory ("RAM") and a Read-Only Memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, data structures or program code for a calendar application, such as GroupWise provided by Novell Corporation or Outlook provided by Microsoft Corporation; a client application, such as a Microsoft Network Messenger Service ("MSNMS") client or America Online Instant Messenger (AIM) client; and an operating system ("OS"), such as the Windows operating system provided by Microsoft Corporation. In addition, storage module 204 may include other program code and information, such as program code for TCP/IP communications; kernel and device drivers; configuration information, such as a Dynamic Host Configuration Protocol ("DHCP") configuration; a web browser, such as Internet Explorer provided by Microsoft Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a LAN port.

Input interface 208 receives input from user 110 via input device 212 and provides the input to CPU 200. Input device 212 may include, for example, a keyboard, a microphone, and a mouse. Other types of input devices may also be implemented consistent with exemplary embodiments.

Output interface 210 provides information to user 110 via output device 214. Output device 214 may include, for example, a display, a printer, and a speaker. Other types of output devices may also be implemented consistent with exemplary embodiments.

Figure 3:
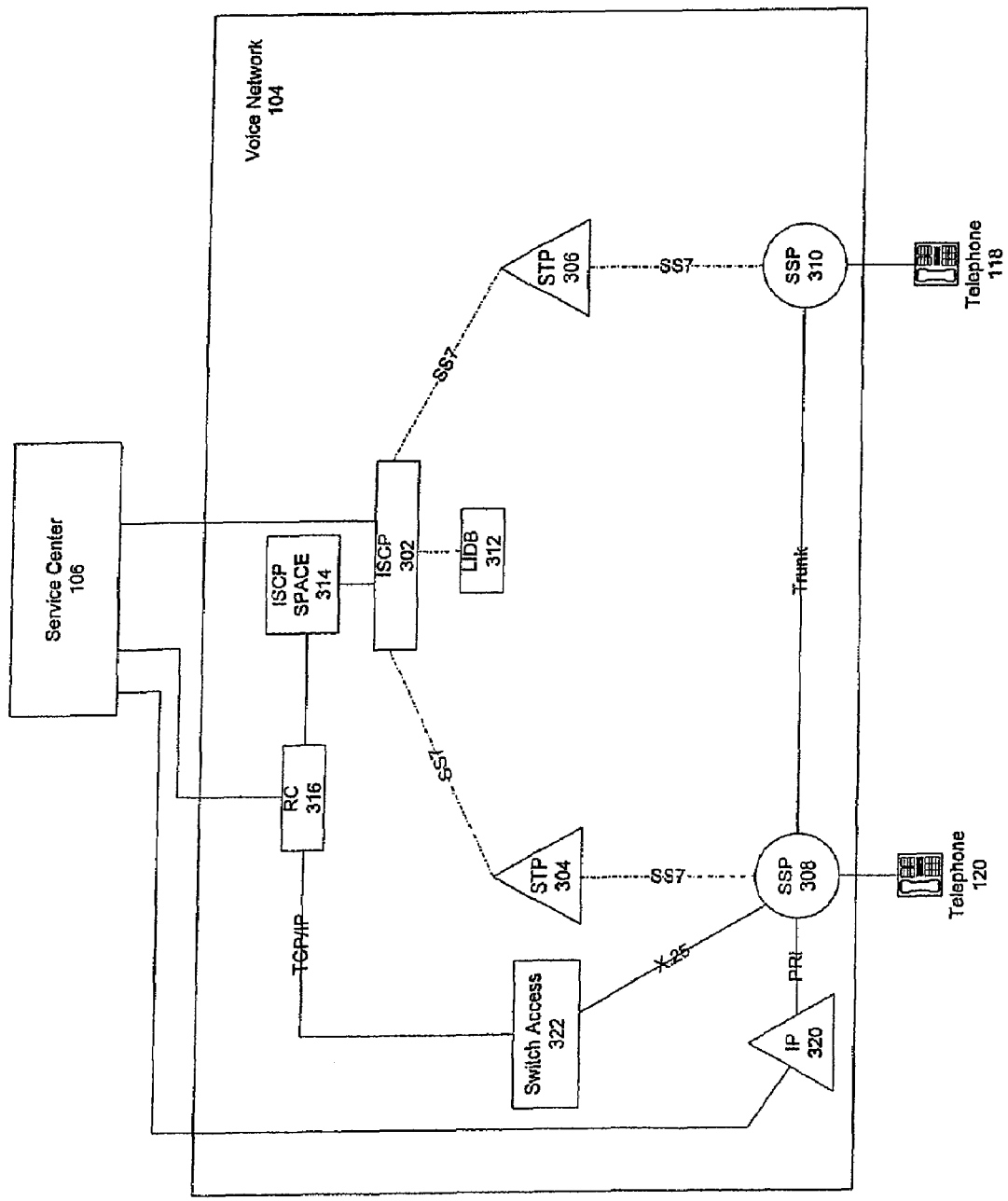
FIG. 3 is a diagram of a voice network, consistent with exemplary embodiments.

FIG. 3 is a diagram of an exemplary voice network, consistent with exemplary embodiments. As shown, voice network 104 includes an Intelligent Service Control Point ("ISCP") 302, Service Transfer Points ("STP") 304 and 306, service switching points ("SSP") 308 and 310, a Line Information Database ("LIDB") 312, an ISCP Service Provisioning And Creation Environment ("SPACE") 314, a Recent Change Environment ("RCE") 316, an Intelligent Peripheral ("IP") 320, and a switch access 322. Although this embodiment of a voice network 104 is described as a PSTN, as discussed above in other embodiments, voice network 104 may be, for example, a voice or video over broadband network a wireless broadband, a wireless voice network, etc.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point ("SCP") or an Advanced Intelligent Network ("AIN") SCP. ISCP 302 provides translation and routing services of SS7 messages to support the features of voice network 104, such as call forwarding. In addition, ISCP 302 may exchange information with the service center 106 using TCP/IP or SS7. ISCP 302 may include service logic used to provide a switch, such as SSP 308 or 310, with specific call processing instructions. ISCP 302 may also store data related to various features that a user may activate. Such features may include, for example, call intercept and voice mail. ISCP 302 may be implemented using a combination of known hardware and software. ISCP 302 is shown with a direct connection to service center 106 and a connection to ISCP SPACE 314, however, any number of network elements including routers, switches, hubs, etc., may be used to connect ISCP 302, ISCP SPACE 314, and service center 106. Further, information exchanged between the ISCP 302 and service center 106 may use, for example, the SR-3389 General Data Interface ("GDI") for TCP/IP or an XML format.

STPs 304 and 306 relay SS7 messages within voice network 104. For example, STP 304 may route SS7 messages between SSPs 308 and 310. STP 302 may be implemented using known hardware and software from manufacturers such as Nortel and Alcatel-Lucent.

SSPs 308 and 310 provide an interface between voice network 104 and phones 114 and 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within Message Signal Units ("MSU") to control calls, perform database queries to configuration database 312, and provide maintenance information.

LIDB 312 comprises one or more known databases to support the features of voice network 104. For example, LIDB 312 may include subscriber (i.e., a user that is a customer of a business entity providing services through one or more components of environment 100) information, such as a service profile, name and address, and credit card validation information. Although, in this figure, LIDB 312 is illustrated as directly connected to ISCP 302, LIDB 312 may be connected to ISCP 302 through an STP (e.g., 304 and 306). Additionally, this communication link may use, for example, the GR-2838 General Dynamic Interface ("GDI") for SS7.

ISCP SPACE 314 may be included as part of the ISCP 302 or be separate from the ISCP 302. For example, the Telcordia ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more recent change engines 316 such as, for example, an Enterprise Recent Change engine ("eRC"); an Assignment, Activation, and Inventory System ("AAIS"); or a Multi-Services Platform ("MSP"). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP or eRC may be used, for example, for providing updates to both SSPs 308 or 310 and ISCPs 302. Or, for example, an eRC may be used for providing updates to SSPs 308 or 310, while an AAIS is used for providing updates to ISCPs 302.

Updates sent to SSPs 308 or 310 may be sent from the recent change engine 316 via a switch access 322 that may, for example, convert the updates into the appropriate protocol for SSP 308 or 310. For example, recent change engine 316 may send updates to SSPs 308 or 310 via TCP/IP. Switch access 322 may then convert the updates from TCP/IP to X.25. This switch access 322 may be implemented using hardware and/or software. These connections may include any number of elements, such as, for example, switches, routers, hubs, etc. and may be, for example, an internal data network for voice network 104.

Voice network 104 may also include one or more IPs. For example, in FIG. 3, an IP 320 is illustrated as being connected to SSP 308. These IPs may be used for providing functions for interaction between users and the voice network, such as voice mail services, digit collection, customized announcements, voice recognition, etc. Moreover, the communications between SSP 308 and IP 320 may use the Primary Rate interface ("PRi") (e.g., the 1129 protocol) protocol. Additionally, the IP 320 may be capable of sending and receiving information to/from the Service Center 106. These communications may use, for example, the SR-3511 protocol. Further, although FIG. 3 illustrates this connection as a direct connection, this connection may include any number of elements including routers, switches, hubs, etc., and may be via, for example, an internal data network for voice network 104.

Figure 4:
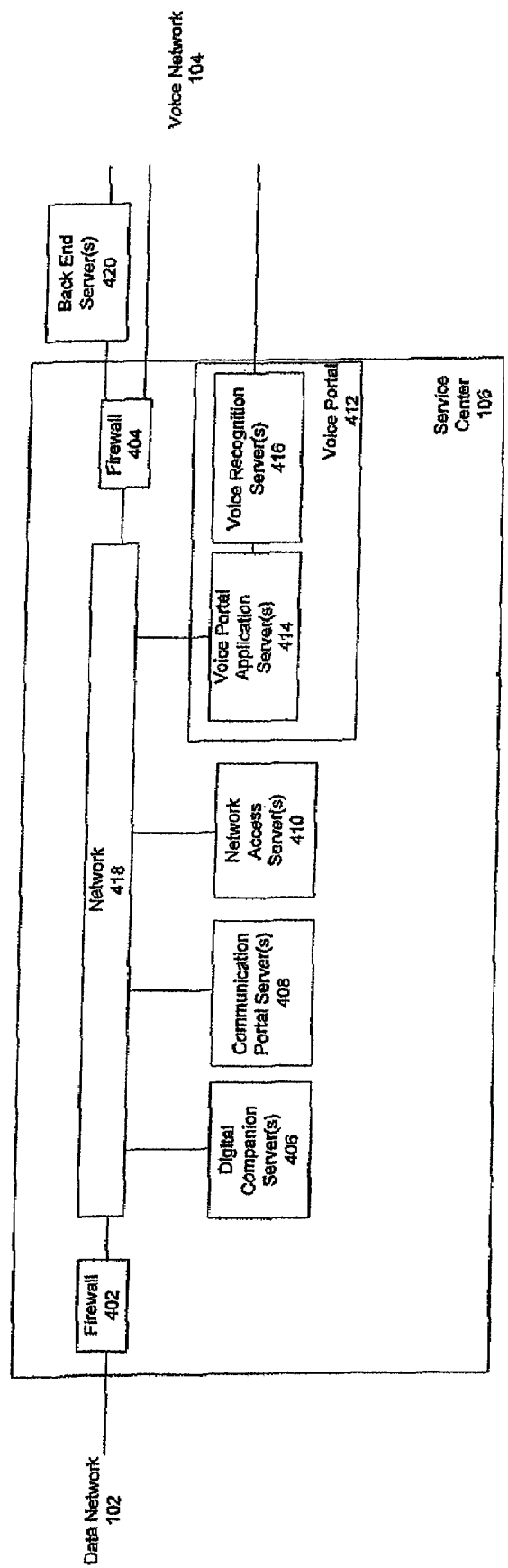
FIG. 4 is a block diagram of a service center, consistent with exemplary embodiments.

FIG. 4 is a block diagram of a service center, consistent with exemplary embodiments. As shown, service center 106 may include firewalls 402 and 404, one or more digital companion servers 406, one or more communication portal servers 408, one or more network access servers 410, and a voice portal 412. The voice portal 412 may include a voice portal application server 414 and a voice recognition server 416. A network 418 may be used to interconnect the firewalls and servers. Additionally, back end server(s) 420 may be provided between the service center 106 and the voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with exemplary embodiments. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any appropriate type of network, such as an Ethernet or FDDI network. Additionally, network 418 may also include switches and routers as appropriate without departing from the scope of embodiments of the invention. Further, additional firewalls may be present in network 418, for example, to place one or more of servers 406, 408, 410, or voice portal 412 behind additional firewalls.

Each server (406, 408, 410, 414, 416, 420) may be any appropriate type of server or computer, such as a Unix or DOS-based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, real-time call management, etc. In one embodiment, real-time call management enables a user to perform several functions as a call is being received, such as sending a call to voice mail, sending a call received on one device to another device, manually initiating protection from telemarketers, playing an announcement for the caller, scheduling a call back, bridging a caller onto a current call, etc.

A communication portal server 408 may provide the hardware and software for managing a customer's account and interfacing with customer account information stored by the provider of customer's voice network 104. The network access servers 410 may provide the hardware and software for sending and receiving information to the voice network 104 in processing the applications provided by the service center. For example, the network access servers 410 may be used for transmitting and/or receiving information from/to an ISCP 302 or an SSP 308 or 310 of the voice network 104.

Voice portal 412 includes software and hardware for receiving and processing instructions from a customer via voice. For example, a customer may dial a specific number for voice portal 412. Then the customer using speech may instruct the service center 105 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
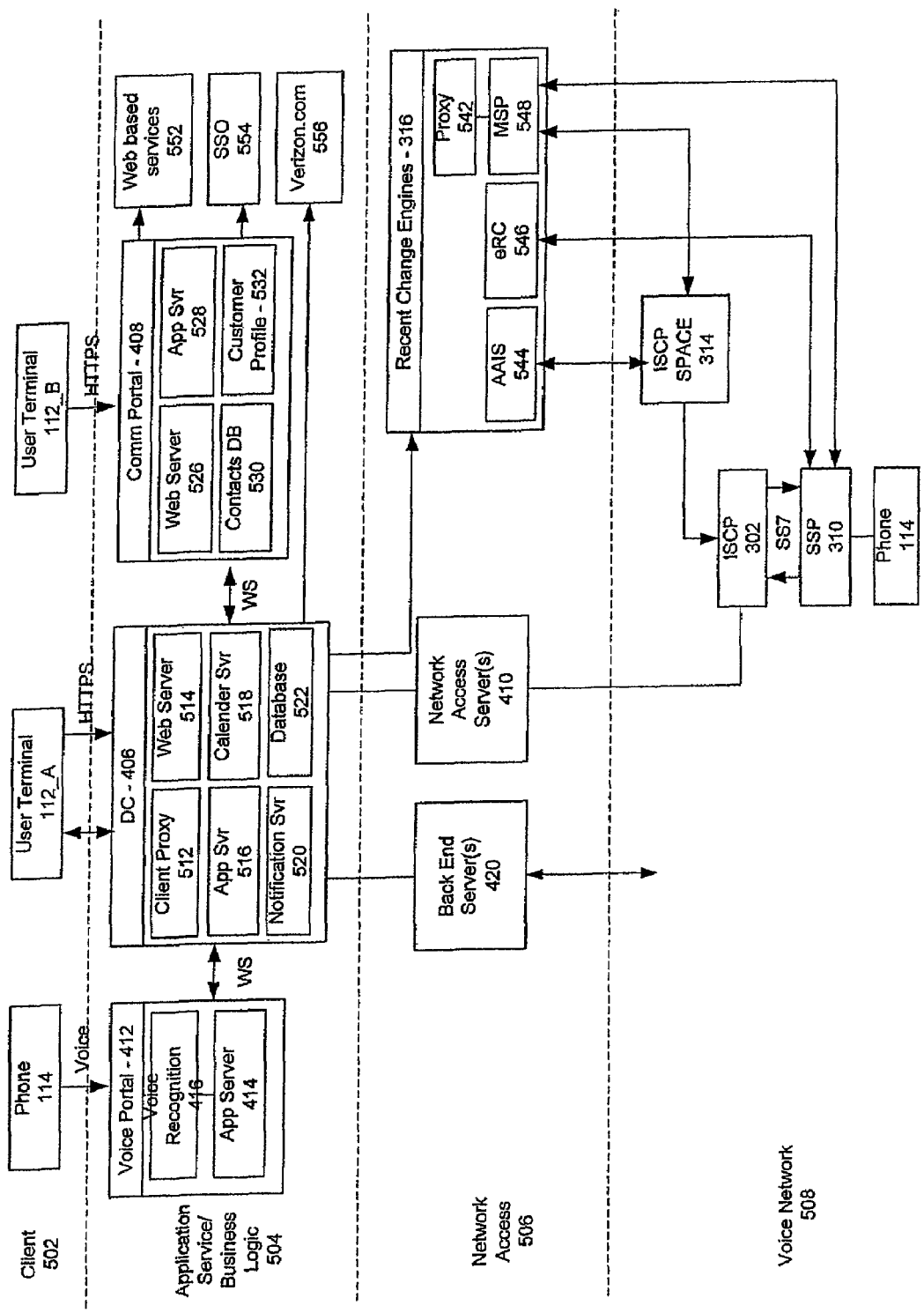
FIG. 5 illustrates a logical architecture of an exemplary system, consistent with exemplary embodiments.

FIG. 5 illustrates a logical architecture of an exemplary system, consistent with exemplary embodiments. As illustrated, the logical architecture may be split into four planes: client side plane 502, application service plane 504, network access plane 506, and voice network plane 508.

Client side plane 502 includes user terminals 112_A and 112_B that a user may use to send and/or receive information to/from the service center 106. Additionally, client side plane 502 includes the user's phone(s) 114. As discussed above, user terminals 112 may be any type of device a user may use for communicating with service center 106. For example, user terminal 112_A may be a PDA running a program for communicating with service center 106, while user terminal 112_B may be a desktop type computer running a web browser for communicating with the service center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using XML, Simple Object Access Protocol ("SOAP"), Web Services Description Language ("WSDL") and Universal Description, Discovery and Integration ("UDDI") open standards over an Internet protocol backbone.

As illustrated, a digital companion server 406 may provide the following functions: a client proxy function 512, a web server function 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. Client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server function 514 provides functionality for receiving traffic over data network 102 from a customer. For example, web server function 514 may be a standard web server that a customer may access using a web browser program, such as Internet Explorer.

Application server function 516 encompasses the general functions performed by digital companion server(s) 406. For example, these functions may include interfacing with the various other digital companion functions to perform specific services provided by the service center. These services may include, for example, interfacing with other function(s), software, and/or hardware to provide a customer with the capability of managing their calls online. Such services may include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, etc.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc. In one aspect of the invention, calendar server function 518 generates and maintains a scheduling data structure, such as a user calendar that includes scheduling events (e.g., meetings, tasks, etc.), that are created by the user through user terminal 112_A. For example, a user may schedule a conference call event in a calendar application reflecting a time and date when the user is to participate in a conference call that is be established in accordance with certain aspects related to exemplary embodiments. Calendar server function 518 may operate with, or leverage, application server function 516 to initiate conference call configuration processes consistent with aspects of the invention.

Notification server function 520 provides the capability to send information from the service center 106 to a user terminal 112. For example, the notification server function 520 at the direction of the application server function 516 may send a notification to the user terminal 112 that the user is presently receiving a phone call at the user's phone 114. This notification may be, for example, an instant message pop-up window that provides an identification of the caller as well as the number being called. The notification may also have a number of user-selectable buttons or items associated with it that enable the user to manage a call in real-time.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of the digital companion servers, provides functionality for receiving traffic over data network 102 from a customer. For example, the web server may be a standard web server that a customer may access using a web browser, such as Internet Explorer.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services. Application server function 528 could then contact these external services 552 to retrieve information, such as an address for a person in the user's address book.

In another example, application server function 528 of communication portal 408 may interface a Single Sign On ("SSO") server 554. SSO 554 may be used to allow users to access all services to which the user subscribes, on the basis of a single authentication that is performed when they initially access the network.

Moreover, application server function 528, similar to application server 516, may provide functionality to facilitate services performed by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, etc.

Contacts database function 530 includes storage devices for storing an address book for the user. This address book may be any appropriate type of address book. For example, the user's address book may include the names, phone numbers, and addresses of people and/or organizations. These storage devices may be internal or external to communication portal servers 406 or some combination in between. In addition, these storage devices may be any type of storage device, such as magnetic storage, memory storage, etc.

Customer profile database function 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Application services plane 504 of the architecture may also include a voice portal 412. As discussed above, the voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network access plane 506 of the architecture includes the functions for providing connectivity between application service plane 502 and voice network 104. For example, this plane may include recent change engines 316, network access servers 410, and/or back end servers 420.

As discussed above, recent change engines 316 may be used to update switches and ISCP databases included in the voice network 104. In one embodiment, recent change engines 316 may include an AAIS 544, an eRC 546, and/or an MSP 548. Additionally, a proxy 542 may be used between the digital companion servers 406 and recent change engines 542 for security purposes.

Network access servers 410 may be included in the service center 106 and may provide the hardware and software for sending and receiving information to voice network 410 in processing the applications provided by the service center. For example, network access servers 410 may include a Caller ID ("CID") functionality for retrieving caller ID information from voice network 104, a Click To Dial ("CTD") functionality for instructing an intelligent peripheral in the voice network to place a call via an SSP, and/or a Real Time Call Management ("RTCM") functionality for interfacing with an ISCP of the voice network.

Network access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. This voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, these back end server(s) 420 may also include, for example, a directory assistance server. This directory assistance server may interface service center 106 with a Reverse Directory Assistance Gateway ("RDA Gateway") of the voice network 104. An RDA Gateway is a device for issuing requests to a Data Operations Center ("DOC") of voice network 104 for name and/or address information associated with a phone number and receiving the name and/or phone number in response to this request.

In another example, back end server(s) 420 may include a wireless internet gateway that is used for interfacing with a Mobile Switching center ("MSC") of a wireless voice network. As with the above-described back end server(s) 420, this wireless internet gateway may be used for converting requests and information between the formats used by service center 106 and those used by the wireless voice network.

In yet another example, back end server(s) 420 may include a Single Number Short Message Service ("SN SMS") server for interfacing service center 106 with a Short Message Service ("SMS") gateway in voice network 104. This may be used to permit the customer to have SMS messages addressed to their home phone number directed to an SMS capable device of the users choosing.

Also, back end server(s) 420 may include a conference blasting server for instructing a conference bridge in voice network 106 to dial out via an SSP to the participants of a voice conference. Alternatively, for example, back end server(s) 420 may include a server for instructing an IP of the voice network to place a call between two parties by dialing out to each of the parties. The back end server(s) may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

Voice network plane 508 includes the hardware and software included in the voice network 104, as discussed above with reference to FIG. 3. For example, voice network plane 508 may include ISCP SPACE 314, ISCP 302, intelligent peripherals 320, and SSP 308. Additionally, voice network plane 508 may also include the hardware and software included in a wireless carrier's network, such as, for example, the mobile switching center, etc.

As noted above, methods and systems consistent with certain aspects related to exemplary embodiments provide an environment from which a user may manage several different features associated with communicating over a telecommunications and/or information exchange network. Among those features are one or more conference call processes that automatically configure and maintain conference calls for a subscriber user through the subscriber user's scheduling calendar and/or address book. In one embodiment, the conference call processes allow the subscriber user to schedule a conference call event that includes one or more other participant users. The processes automatically establish a conference call between the users at the scheduled time and/or date scheduled by the subscriber user.

Figure 6:
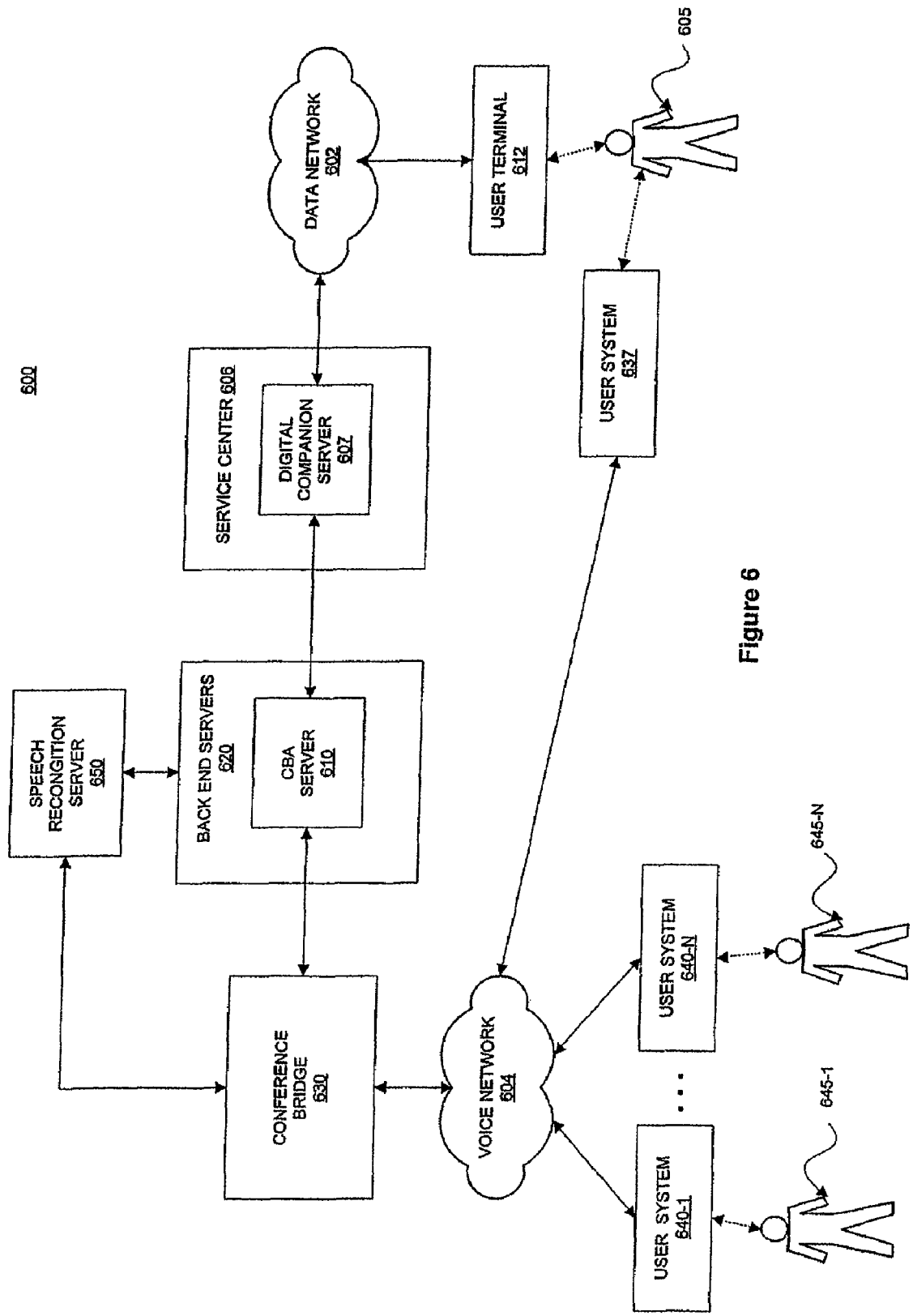
FIG. 6 is a diagram of an exemplary conference call environment consistent with exemplary embodiments.

FIG. 6 shows an exemplary network environment 600 that performs the conference call processes consistent with certain aspects related to exemplary embodiments. As shown, environment 600 includes data network 603, voice network 604, service center 606, user terminal 612, back-end servers 620, conference bridge 630, user systems 637 and 640-1 to 640-N, users 645-1 to 645-N, and speech recognition server 650.

User terminal 612 is a terminal operated by a subscriber user 605 that is configured and operates in a manner consistent with user terminal 112 shown in FIG. 1. Data network 602 is a network that provides communications between various entities in environment 600, such as user terminal 612 and service center 606, in a manner consistent with data network 102 described above in connection with FIG. 1. Voice network 604 is a telephony-based network that provides communications between selected entities in environment 600, such as users 645-1 to 645-N and conference bridge 630 in a manner consistent with voice network 104 described above in connection with FIG. 1.

Service center 606 provides a platform for managing communications over data network 602 and voice network 604 in a manner consistent with service center 106 described above in connection with FIG. 1. In one embodiment, service center 606 includes Digital Companion Server ("DCS") 607 that provides customer related services in a manner consistent with digital companion server 406 described above in connection with FIGS. 4 and 5.

Back end servers 620 may be one or more computing systems that interface service center 606 and voice network 604. Back end servers 620 may include hardware and/or software and operates in a manner consistent with back-end servers 420 described above in connection with FIG. 5. In one embodiment, back end servers 620 includes a Conference Blasting Application ("CBA") server 610 that executes software to perform one or more conference call processes, including a process that generates messages used by environment 600 to set up a conference call associated with subscriber user 605.

Conference bridge 630 is a network bridge that establishes communications between selected ones of users 645-1 to 645-N and subscriber user 605. In one embodiment, conference bridge 630 receives instructions from DCS 607 to set up conference calls in accordance with a conference call event configured by DCS 607. Further, conference bridge 630 provides telecommunication services associated with one or more calls during a conference call process.

User systems 640-1 to 640-N may be communication systems operated by respective users 645-1 to 645-N. Through user systems 640-1 to 640-N and voice network 604, users 645-1 to 645-N may communicate with each other using one or more types of communication devices. Accordingly, user systems 640-1 to 640-N may represent telephony based devices, such as wireline or wireless telephones. Alternatively, user system 640-1 to 640-N may represent user terminals that operate in a manner consistent with user terminal 612. User 605 may also communicate with users 640-1 to 640-N through user system 637 and voice network 604.

Speech recognition server 650 is a computing system that converts audio information provided by conference bridge 630 into speech information. Server 650 transcribes the speech information into text data that is stored in one or more data storage devices (not shown). In one embodiment, speech recognition server 650 is located external to any components of environment 600. Alternatively, server 650 may be included as a server within back end servers 620.

In one embodiment, user 605 may be a subscriber to one or more services offered by service center 606. That is, user 605 may be a user that registers with a business entity associated with service center 606 to receive one or more communication services offered by the components of environment 600, such as service center 606. For example, user 605 may be a subscriber to service center 606 to receive calls through a preferred device. A preferred device is one of a plurality of communication and/or computing devices associated with the subscriber (e.g., user 605). Such devices include, for example, PDAs, wireless telephones, wireline telephones, etc. In one embodiment, service center 606 may receive information pertaining to a call directed to user 605 from a calling party, and retrieve data corresponding to user 605 using the received information. Service center 606 may determine a preferred device of user 605 based on the retrieved information. Thereafter, service center 606 may ascertain whether the preferred device of the user requires a new mode of delivery, and if so, routes the call to the preferred device of the user to be compatible with the new mode of delivery. The methods and systems associated with the preferred device aspects related to exemplary embodiments are further described in U.S. patent application Ser. No. 10/720,633, entitled "METHODS AND SYSTEMS FOR AUTOMATIC FORWARDING OF CALLS TO A PREFERRED DEVICE," the contents of which are hereby incorporated by reference in their entirety.

Figure 7:
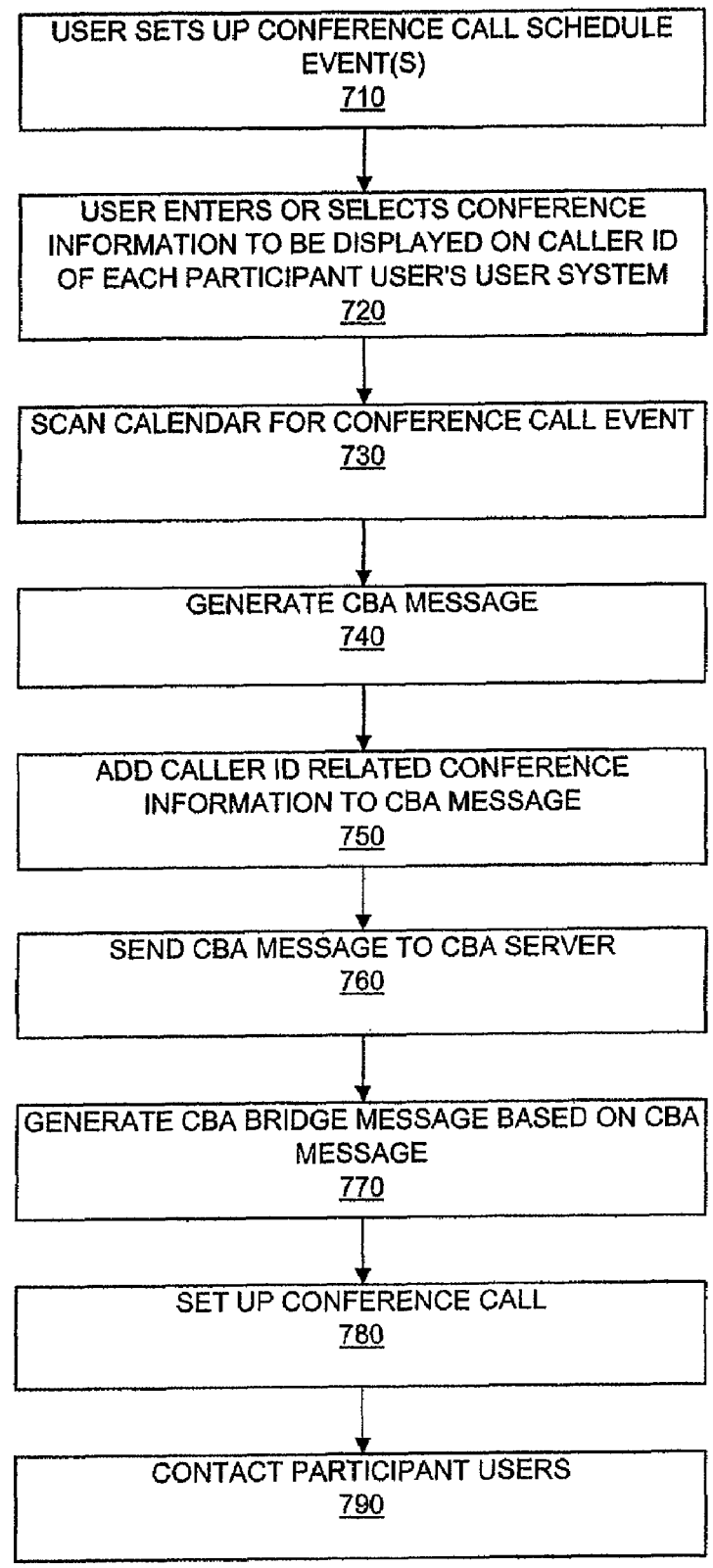
FIG. 7 is a diagram of an exemplary flowchart of a conference call configuration process consistent with exemplary embodiments.

Methods and systems consistent with certain aspects of exemplary embodiments automatically configure and maintain a conference call between user 605 and one or more users 645-1 to 645-N. FIG. 7 is a flowchart of an exemplary conference call configuration process that may be performed by environment 600. In one embodiment, user 605 may set up one or more conference call scheduling events through user terminal 612 and service center 606 (Step 710). For example, user 605 may access a calendar application and an address book provided by service center 606 to add participant users to a proposed conference call meeting. To do so, in one example, user 605 may access participant user information displayed in a graphical representation of an address book corresponding to user 605. Using an input device (e.g., a mouse, stylus, etc.), user 605 may select profile information for a participant user (e.g., user 645-1) from the address book and drop it in a conference call icon included in the calendar application for a proposed time and date (e.g., Monday, Dec. 7, 2003, 9:00 AM EST). Alternatively, user 605 may select a date and time for a proposed conference call and add participant users to a participant list provided in graphical form on the display device in user terminal 612. In one embodiment, service center 606 employs an application server function (e.g., application server function 516) within DCS 607 to allow user 605 to schedule a conference call to take place at a specific time and date. Different mechanisms and methods may be employed by environment 600 to enable user 605 to schedule a conference call with one or more participant users 645-1 to 645-N, as is well known.

In one embodiment, the service center 606 may be configured to allow user 605 to enter, select, or otherwise designate conference information that the user wishes to be displayed in caller identification (ID) fields that will be sent out to each participant user's corresponding user system when the participant users are contacted for the conference call (Step 720). Such information may include, for example, information identifying the fact that the incoming call is a conference call, the subject of the conference call, the name of the user initiating the conference call (e.g., user 605), and any other type of information associated with the call. In one example, when scheduling a conference call, user 605 may use an input device (e.g., a keyboard, mouse, stylus, etc.) to provide service center 606 with a set of conference information that can be used by a bridge (e.g., conference bridge 630) to populate caller ID fields that will be sent out to the attendees of the conference call. In this instance, as will be described below, DCS 607 may include the caller ID related conference information in a Conference Blasting Application ("CBA") message provided to CBA server 610. And, in turn, CBA server 610 may include the conference information in a CBA bridge message provided to conference bridge 630.

Periodically, DCS 607 may scan the calendar application associated with user 605 to determine whether a conference call event is detected (Step 730). The conference call event may act as a trigger that directs DCS 607 to automatically set up a conference call for user 605. For example, DCS 607 may determine whether a current date and time matches, or is within some predetermined range of, a scheduled conference call for user 605. For instance, suppose user 605 previously scheduled a conference call with three participant users listed in user 605's address book for a particular date (e.g., Monday, Nov. 17, 2003, at 10:00 AM EST). On that date and/or time (i.e., Nov. 17, 2003), or sometime earlier, a DCS 607 function, such as calendar service function 518, may trigger a conference call event that instructs DCS 607 to begin configuring a conference call in accordance with the particulars set up by user 605 and represented in the user's calendar.

Once a conference call event is detected, DCS 607 generates a Conference Blasting Application ("CBA") message (Step 740). The CBA message includes profile information for each participant user included in a participant list associated with the detected scheduled conference call. For example, DCS 607 may collect the telephone numbers and identifiers for each participant user and add them to the CBA message. DCS 607 may also be configured to collect and add conference information to the CBA message, which can be used by a bridge (e.g. conference bridge 630) to provide meaningful caller ID information to each of the participant users associated with the conference call (Step 750). Such information may include information identifying the fact that the incoming call is a conference call, the subject of the call, the name of the user initiating the call (e.g., user 605), and any other type of information associated with the call. As noted above, service center 606 may be configured to allow user 605 to enter and/or select the conference information that the user wishes to be displayed in the caller ID fields of participant users. Alternatively, service center 606 may be configured to automatically generate and add conference information to the CBA message without requiring input from the user 605. For example, in one instance, when a conference call event is detected, DCS 607 may be configured to automatically generate and add conference information to the CBA message which indicates that the caller ID fields to be sent out to participant users are to at least include information identifying the fact that the incoming call is a conference call and the name of the user initiating the call (e.g., user 605). Once the CBA message is generated, DCS 607 formats the message for an appropriate transmission protocol and sends the message to CBA server 610 (Step 760). In one embodiment, DCS 607 may format the CBA message into an XML message and transmit the message to CBA server 610 using TCP/IP protocol. Other types of transmission protocols and information formats, however, may be implemented by service center 606 and DCS 607 to transport the CBA message to CBA server 610.

CBA server 610 may extract the information included in the CBA message to generate a CBA bridge message (Step 770). A CBA bridge message is a set of commands that are directed to a specific bridge (e.g., conference bridge 630) that instructs the bridge to set up a conference call by dialing out to the participant users identified in the CBA message. In one embodiment, the CBA bridge message may also include one or more commands instructing the bridge to replace (or augment) any default caller ID information that is to be sent out to the participant users, with the conference information provided in the CBA message. As indicated above, such information may include information identifying the fact that the incoming call is a conference call, the subject of the call, the name of the user initiating the call (e.g., user 605), and any other type of information associated with the call. In one embodiment, CBA server 610 may determine which one a plurality of bridges (not shown) in environment 600 is configured to handle conference call communications with any of users 645-1 to 645-N. CBA server 610 may identify conference bridge 630 as being dedicated to handle conference call operations and thus generate a CBA bridge message based on the identification of bridge 630. That is, CBA server 610 may format a message that includes one or more commands directed to conference bridge 630.

Conference bridge 630 receives the CBA bridge message and, based on the commands included in the message, sets up a conference call that includes user 605 and any participant users identified in the CBA bridge message (Step 780). In one embodiment, conference bridge 630 collects the telephone number for each participant user 645-1 to 645-N from the CBA bridge message. In another embodiment, conference bridge 630 may collect caller ID related conference information from the CBA bridge message and place it in the caller ID fields that will be sent out when the bridge dials the participant users associated with the conference call. Once the conference call is configured, conference bridge 630 uses the collected telephone numbers and the collected caller ID related conference information to establish a connection with participant users 645-1 to 645-N (Step 790). In one embodiment, conference bridge 630 may dial out to each user system 640-1 to 640-N operated by a participant user 645-1 to 645-N using the signaling protocols and/or components implemented by voice network 604, such as SCPs, SSPs, SCPs, ISCPs, SS7 protocol infrastructures, etc.

In one embodiment, one or more participant users 645-1 to 645-N may be subscribers to service center 606. Accordingly, when generating the CBA message, DCS 607 may determine whether a participant user is a subscriber to service center 606. If so, DCS 607 may determine whether the subscriber participant user 645-1 to 645-N has subscribed for a preferred device service, (i.e., a Digital Companion (DC) user). In such a case, DCS 607, through components of service center 606 and/or DCS 607 (e.g., network access servers 410, application server 516, etc.) formats the CBA message to reflect the type of preferred device by which the subscriber participant user prefers to be contacted. For example, if the subscriber participant user indicates a desire to be contacted via a PDA, service center 606 formats the CBA message to include the contact information required to establish a connection with the subscriber participant user's PDA. Further, if the type of delivery mode requires adjustment because of the type of preferred device indicated by the subscriber participant user, DCS 607 may format the CBA message to reflect the type of delivery mode that is to be used to establish contact with the subscriber participant user. The manner by which DCS 607 determines and establishes communications with a subscriber participant user having a preferred device service may be consistent with the features and processes described in the aforementioned U.S. patent application Ser. No. 10/720,633, entitled "METHODS AND SYSTEMS FOR AUTOMATIC FORWARDING OF CALLS TO A PREFERRED DEVICE."

Figure 8:
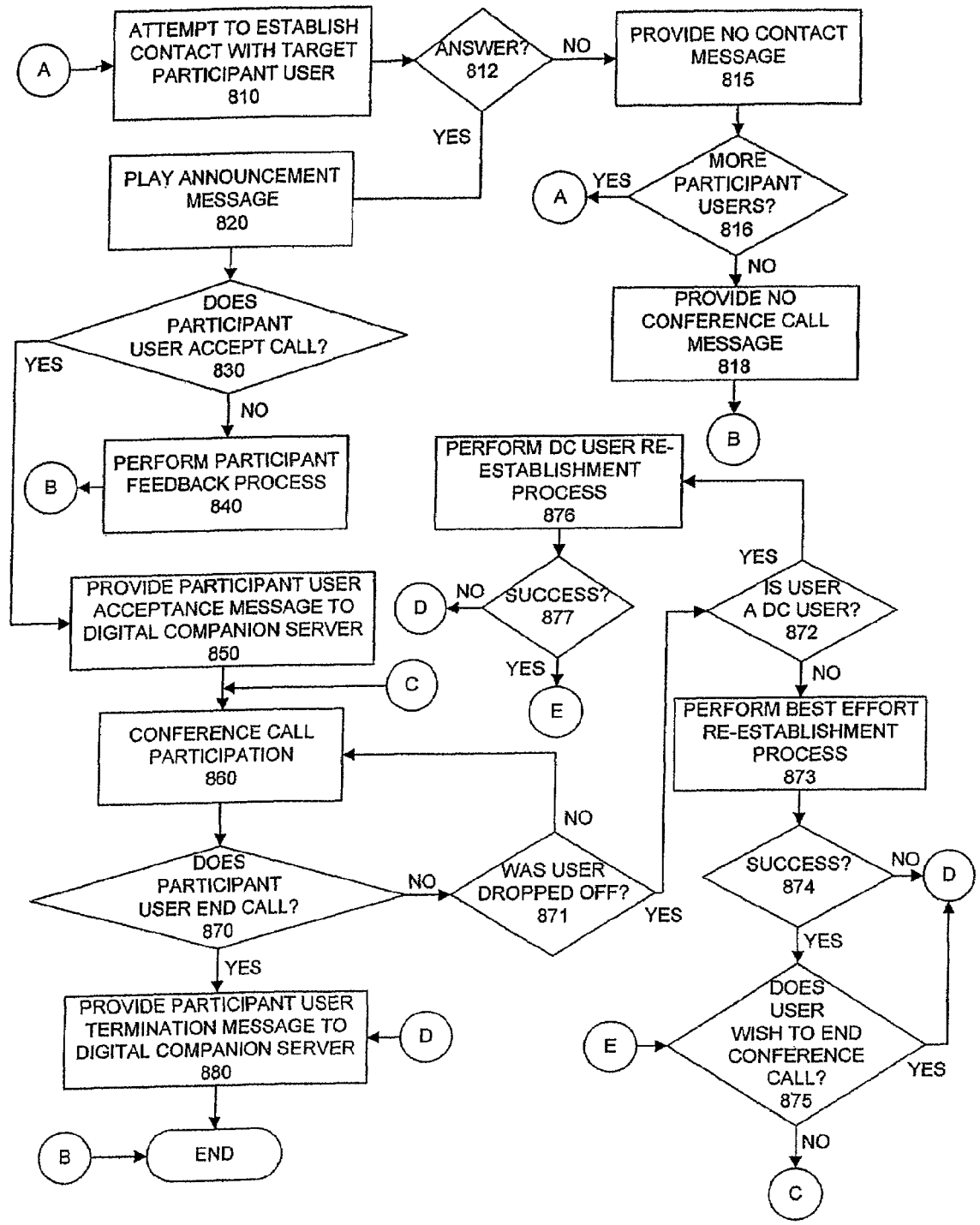
FIG. 8 is a diagram of an exemplary flowchart of a conference call process consistent with exemplary embodiments.

Once communication is established with a participant user (e.g., user 645-1), methods and system consistent with certain aspects related to exemplary embodiments may perform a conference call process. FIG. 8 shows a flowchart of an exemplary conference call process that may be performed by one or more components of environment 600 in a manner consistent with certain aspects related to exemplary embodiments. As shown, the conference call process may begin when conference bridge 630 attempts to establish communication contact with a target participant user (e.g., user 645-1) by calling the participant user's corresponding user system (e.g., user system 640-1) (Step 810). In one embodiment, conference bridge 630 may be configured to insert conference information into the caller ID fields that are sent out when the bridge dials the participant user's corresponding user system. Such information, which can be provided to the conference bridge 630 via a CBA bridge message, may include information identifying the fact that the incoming call is a conference call, the subject of the call, the name of the user initiating the call (e.g., user 605), and any other type of information associated with the call. If the target participant user does not answer the conference call from bridge 630 (Step 812; NO), conference bridge 630 may generate and provide a NO CONTACT message to DCS 607 through CBA server 610 (Step 815).

In one embodiment, the NO CONTACT message may indicate to DCS 607 that the target participant user did not answer the conference call. Additionally, the NO CONTACT message may also identify the target participant user, the telephone number called, the time called, and any other type of information associated with the attempted conference call contact operation. DCS 607 may generate a DCS NO CONTACT message including some or all of the NO CONTACT message information provided by bridge 630, and send the DCS NO CONTACT message to user terminal 612 through data network 602. Alternatively, or additionally, DCS 607 may provide the DCS NO CONTACT message information to conference bridge 630 through CBA server 610. Bridge 630 may then provide the NO CONTACT information to user 605 through user system 637 in, for example, voice format. In another embodiment, conference bridge 630 may provide the NO CONTACT message information directly to user system 637 upon determining that the target participant user did not answer the conference call. Other combinations of messages, information, and components may be used to notify user 605 of the unanswered conference call.

Following the generation and provision of the no-contact message, conference bridge 630 may determine whether there are any more participant users included in the scheduled conference call that bridge 630 has not yet contacted (Step 816). If so (Step 816; YES), bridge 630 attempts to establish contact with the new target participant user (Step 810). On the other hand, if conference bridge 630 has attempted to contact every participant user identified in the CBA bridge message for the conference call, and none of the users have answered the call (or communication could not be established for another reason) (Step 816; NO), conference bridge 630 may generate a no conference call message to DCS 607 indicating that the scheduled conference call can not be processed because of the lack of participant users (Step 818). In one embodiment, DCS 607 may provide the no conference call message to user terminal 612 in a manner similar to that described above in connection with the NO CONTACT message. Further, bridge 630 may provide the no conference call message directly to user system 637 in a manner similar to that described above in connection with the NO CONTACT message. Note that steps 810 through 816 may be performed in parallel for multiple target participants where such capabilities are available to conference bridge 630.

Referring back to FIG. 8, if a target participant user did answer the conference call (Step 812; YES), conference bridge 630 may generate and play one or more announcements to the target participant user (via the user's corresponding user system) (Step 820). The announcement may include a voice message indicating to the participant user that the target participant user is scheduled to participate in a scheduled conference call. The announcement may also identify other participant users (e.g., 645-N) and the user initiating the conference call (e.g., user 605). Other types of announcements may be provided by conference bridge 630 that include additional information associated with the conference call, such as subject of the call, a proposed agenda, etc. Also, additional messages may be provided to user 605, such as a message indicating that a conference call has been configured in accordance with a scheduled conference call previously set up by user 605 through service center 606. Further, other components of environment 600 (shown or not shown in FIG. 6) may provide the one or more announcements to the participant user. That is, conference bridge 630 may leverage another processing component to provide conference call participant announcements to participant users 645-1 to 645-N.

Additionally, the announcements may be pre-configured and/or selected by user 605 using service center 606. In one example, when scheduling a conference call, user 605 may provide service center 606 with a pre-configured announcement that is used by conference bridge 630 when a participant user answers a conference call. In this instance, DCS 607 may include the pre-configured announcement in the CBA message provided to CBA server 610. And, in turn, CBA server 610 may include the pre-configured announcement message in the CBA bridge message provided to conference bridge 630. In another embodiment, conference bridge 630 may provide a generic conference call announcement that is common to other conference calls established by bridge 630 prior to, during, or subsequent to, the conference call established for user 605 in the conference call process described in connection with FIGS. 7 and 8.

Upon answering the conference call, the target participant user may have the option of accepting or not accepting the call. If the target participant user accepts the call (Step 830; YES), the conference call process proceeds at Step 850, described below. If, on the other hand, the target participant user does not accept the conference call (Step 830; NO), conference bridge 630 may perform a participant feedback process consistent with certain aspects of exemplary embodiments (Step 840).

The participant feedback process provides the target participant user one or more options for refusing the conference call. For example, bridge 630 may provide a feedback message to the target participant user including a list of options the target participant user may select to refuse the call. These options may include refusing the conference call outright (i.e., do not accept the call and hang up), leave a message for the initiating user (e.g., user 605), set an alternate telephone number or preferred device to contact the target participant user, and instruct the conference bridge 630 to dial back in a user-specified amount of time (e.g., a number of minutes). The target participant user may make the appropriate selection using voice commands and/or Dual Tone Multi-Frequency ("DTMF") responses that are processed by conference bridge 630 using speech recognition and/or DTMF processes, respectively.

If the target participant user refuses the conference call, conference bridge 630 may generate and provide a refusal message to user 605 through user system 637 by way of voice network 604 and/or user terminal 612 by way of CBA server 610 and DCS 607. Alternatively, if the target participant user wishes to leave a message for user 605, conference bridge 630 may record the target participant user's response to the conference call and provide the response to user 605 in a similar manner (e.g., via user system 637 and/or user terminal 612). Also, if the target participant user wishes to instruct bridge 630 to call them back using an alternate telephone number, conference bridge 630 may receive the alternate number from the target participant user and attempt to re-establish the conference call connection with the target participant user based on the alternate number (Step 810). Moreover, if the target participant user instructs bridge 630 to call back, bridge 630 may request and record a specified period of time that bridge 630 is to attempt to contact the target participant user. When the specified period of time expires, bridge 630 may perform Step 810 to re-execute the conference call process for that target participant user.

It should be noted that conference bridge may offer and perform any of the feedback process options individually or in combination with each other. That is, bridge 630 may allow the target participant user to set an alternate telephone number and instruct bridge 630 to call back in a specified period of time. Further, the participant feedback process options described above are exemplary and not intended to be limiting, thus conference bridge 630 may offer and process other options associated with a target participant user's refusal to accept a conference call. Once the participant feedback process is completed, the conference call process may end (for that participant).

Referring back to FIG. 8, if the target participant user accepts the conference call (Step 830; YES), conference bridge 630 may generate and provide a participant user acceptance message to DCS 607 (Step 850). The acceptance message includes information reflecting the target participant user's acceptance of the call. This information may also include information identifying the target participant user, the status of the target participant user's acceptance of the call, and any other type of information associated with the conference call and/or the target participant user. For example, the acceptance message may include voice or text information indicating that the target participant user has accepted the conference call and is joining in the conference initiated by DCS 607. The target participant user may be identified by a conference call identifier, the participant user's name, and/or the participant user's telephone number. DCS 605 forwards this information to user 605 in the appropriate format through user terminal 612. Alternatively, or additionally, conference bridge 630 may provide the acceptance message to user 605 through user system 637 and voice network 604.

Once the target participant user accepts the conference call, the user may participate in the conference with user 605 and any other participant users (645-1 to 645-N) that have also joined the call (Step 860).

During the conference call, conference bridge 630 may detect a disconnection event reflecting a condition when the target participant user's connection with conference bridge 630 has been terminated. Termination of the participant user's call may be the result of many actions. For instance, the participant user may have ended the call voluntarily (e.g., hung up) or the connection between the participant user and conference bridge 630 may have been terminated for unwanted reasons (i.e., dropped off, line disconnections, user system communication problems, voice network 604 failure, etc.). Accordingly, in one embodiment, the conference call process may determine whether the target participant user ends their participation in the conference call (Step 870). Alternatively, or additionally, conference bridge 630 may monitor the connections of each participant user 630 to detect an involuntary disconnection (e.g., Step 871, described further below).

In one embodiment, the conference call process may implement one or more rules to determine whether the participant user voluntarily or involuntarily dropped from the conference call. For example, one or more rules may be stored as software code in a memory device that enables the conference call process to determine the type of disconnection that may have occurred. To do so, in one embodiment, the conference call process may determine the type of device the participant user (i.e., user system 640) used to participate in the call. Based on the type of device, the process may determine whether the participant user ended participation voluntarily (e.g., hung up) or was disconnected. For example, a rule may be established that determines that an involuntary disconnection event occurs when the participant user was using a wireless or IP phone when the user's participation ended before the conference call was completed. On the other hand, another rule may establish that the user voluntarily ended participation in the call when they were using a wireline device. The above rules are intended to be exemplary and different rules and/or automated logic may be implemented to determine the type of drop off that occurs during a conference call.

If the target participant user voluntarily ends participation in the call (Step 870; YES), conference bridge 630 may generate and provide a participant user termination message to DCS 607 (Step 880). The termination message may include information identifying the target participant user, the participant user's telephone number, a time that the participant user ended participation, and any other type of information bridge 630 may be programmed to provide upon the target participant user terminating their participation in the conference call. DCS 607 may provide the termination message to user 605 through user terminal 612. Alternatively, or additionally, conference bridge 630 may provide the termination message to user 605 through user system 637 and voice network 604.

Following the delivery of the termination message, the conference call process may end for the target participant user. Environment 600 may, however, continue to execute the conference call process for any other remaining participant users and user 605 until the conference call no longer includes any participant users. In one embodiment, the conference call process may continue for participant users 645-1 to 645-N following termination of the call by user 605. Additionally, while the conference call is still established and includes at least one participant user and/or user 605, any participant users (or user 605) may rejoin the call by contacting conference bridge 630 using a predetermined telephone number and/or conference identifier. Alternatively, user 605 may instruct conference bridge 630, through a CBA message generated by DCS 607, to contact a participant user who previously terminated their participation in the call. These processes are described with reference to Steps 871-877.

Referring back to Step 870, if the participant user did not end the call voluntarily (Step 870; NO), the conference call process may determine whether the participant user was dropped from the call involuntarily due to an disconnection event (e.g., diminishing cellular phone communication power, communication line disconnections, power loss, network infrastructure failures, etc.) (Step 871). If the user was not dropped from the call (Step 871; NO), the user continues with participation in the conference call (Step 860). On the other hand, if the participant user was dropped from the call (Step 871; YES), the conference call process determines whether the participant user is a DC user (i.e., a user registered with service center 606 and has access to the services offered by DCS 607) (Step 872). If the user is not a DC user (Step 872; NO), a best effort re-establishment process is performed (Step 873).

In one embodiment, the best effort re-establishment process may determine the phone number of the device the participant user operated when participating in the conference call. Using that number, the best effort re-establishment process may leverage conference bridge 630 to call the number in an attempt to re-establish communications with the participant user. If communications are not re-established with the participant user (Step 874; NO), the process repeats communication attempts for a predetermined number of times before proceeding to Step 880 (terminating the participant user). If, however, communications is re-established with the participant user (Step 874; YES), the conference call process may query the participant user whether they wish to be reconnected or dropped from the conference call (Step 875). If the user wishes to end participation (Step 875; YES), the process proceeds to Step 880. If the user wishes to continue participation in the call (Step 875; NO), the process returns to Step 860.

Referring back to Step 872, in the event the participant user is a DC user (Step 872; YES), the conference call process may perform a DC user re-establishment process (Step 876). In this process, the profile for the participant user is accessed from DCS 607 to determine, among other things, the user's preferred device list and the telephone or contact numbers for each preferred device. Further, the DC user re-establishment process may collect information from DCS 607 indicating whether the user desires to be automatically contacted during a conference call drop event (i.e., if the user was disconnected during a conference call). The conference call process uses the collected profile information to attempt to re-establish communications with the participant user through the user's preferred device. If one device does not work, the process may attempt communications with another preferred device. If communication is not established after exhausting the desired profile communication contact techniques (Step 877; NO), the conference call process proceeds to Step 880. If, however, communications was re-established with the participant user (Step 877; YES), the process continues at Step 875 (confirming a desire to rejoin the conference).

It should be noted that the conference call process determines the participant user's preferred device at the time of participation in the conference call. For example, consider an exemplary scenario where a participant user is participating in a conference call using a wireless device while traveling in a vehicle to a place of employment (i.e., their office). If the participant user is dropped from the conference call (or the user hangs up when they arrive at their place of employment), the user may access DCS 607 to reassign their preferred device (or reprioritize) to their office wireline device. Accordingly, DCS 607 may attempt to re-connect with the user through the user's office wireline device. Alternatively, if DCS 607 unsuccessfully attempts to re-connect the participant user to the conference call through the wireless device used during the call prior to drop off, DCS 607 may be configured to call the user's office wireline device. Accordingly, DCS 607 determines a DC participant user's preferred device based on either the device used by the user during the conference call, or through the user's profile registered with DCS 607.

In addition to establishing and maintaining conference calls, methods and systems consistent with certain aspects related to exemplary embodiments enable voice communications during a conference call to be recorded and transcribed. In embodiment, conference bridge 630 may independently collect audio information from each channel of a conference call (e.g., audio signals received from each user system 640-1 to 640-N that are participating in a conference call). Bridge 630 may route the collected audio information to speech recognition server 650, which converts the audio information to speech information. Conference bridge 630 may directly route the audio information to server 650 or indirectly route the signals through back end servers 620 or other components of environment 600. Speech recognition server 650 may create a transcript of text data from the speech information that identifies each speaker (i.e., user 645-1 to 645-N and user 605) based on the speaker's communication connection established between voice network 604 and the speaker's corresponding user system 640-1 to 640-N. Speech recognition server 650 may also synchronize the transcript using time data that is encoded in the recorded audio information provided by conference bridge 630. In one embodiment, speech recognition server 650 stores any audio information that cannot be converted to text data as audio files. Server 650 may insert pointers to the audio files in an appropriate location of the transcript. Thus, speech recognition server 650 may create a transcript that includes a sequence of text data that corresponds to the conversations between participant users 645-1 to 645-1 and user 605 during a conference call. The transcript may include, at some temporal based location in the transcript where text data could not be converted, a pointer to one or more audio files that includes non-converted audio information corresponding to a speaker that was talking during that moment in time reflected in the transcript.

Speech recognition server 650 may be configured to store the transcript in one or more storage devices located within server 650 or external to server 650, such as a storage device associated with database 555. Further, speech recognition server 650 may format the transcript into a file that is provided to user 605's email address included in DCS 607. Alternatively, speech recognition server 650 may allow subscriber user 605 to access the stored transcript through service center 606.

Figure 9:
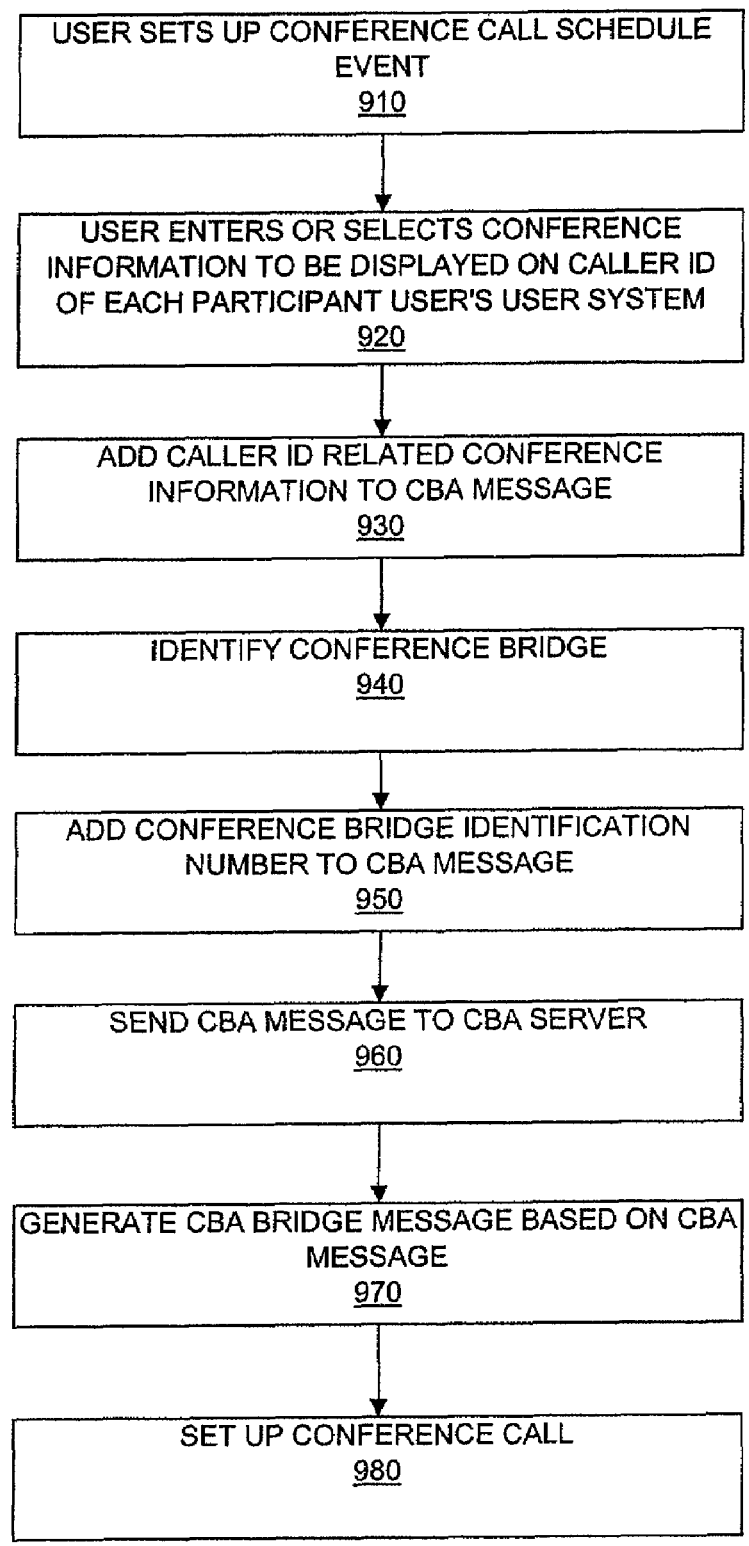
FIG. 9 is a flowchart of an exemplary ad-hoc conference call process consistent with exemplary embodiments.

Methods and systems consistent with certain exemplary embodiments may also allow user 605 to configure a conference call to take place immediately, or nearly immediately, following user 605's request. FIG. 9 shows a flowchart of an exemplary ad-hoc conference call process that may be performed by system 600. Using the ad-hoc conference call process, user 605 may leverage DCS 607 to create a conference call "on the fly" such that DCS 607 does not monitor a scheduling application (e.g., calendar application) to detect a scheduling event. In other words, user 605 may set up a scheduling event to take place at the time user 605 requests a conference call (Step 910).

When setting up a conference call scheduling event "on the fly," user 605 may access service center 606 through user terminal 612 to establish a conference call with participant users 645-1 to 645-N. In one aspect, user 605 may access DCS 607 to identify one or more participant users 645-1 to 645-N. For example, user 605 may access an address book that includes a list of participant users from which user 605 may select to participate in a conference call. This may be performed, for example, by highlighting one or more participant users listed in a menu displayed to user 605 via user interface 612. Alternatively, or additionally, user 605 may designate one or more participant users 645-1 to 645-N that are not included in the list. In this instance, user 605 may provide DCS 607 with contact information (e.g., telephone numbers, IP addresses, etc.) corresponding to each designated participant user.

In another aspect, when setting up the conference call, user 605 may also access DCS 607 to enter and/or select conference information that the user wishes to be displayed in the caller ID fields that will be sent out by the bridge 630 when the bridge dials the participant users associated with the conference call (Step 920). In one embodiment, the caller ID related conference information can be added to a CBA message generated by DCS 607 in a manner consistent with the process described in connection with Step 750 of FIG. 7 (Step 930). As noted above, such information may include information identifying the fact that the incoming call is a conference call, the subject of the call, the name of the user initiating the call (e.g., user 605), and any other type of information associated with the call.

Once user 605 selects and/or designates target participant users to be included in a conference call, and enters, selects or otherwise designates any conference information that is to be provided to the participant users via caller ID fields that will be sent out by the bridge, DCS 607 automatically sets up and initiates the conference call. In one embodiment, DCS 607 may also identify a conference bridge that may be used to establish and facilitate the conference call (Step 940). For example, user 605 may have a profile entry registered with DCS 607 that identifies a conference bridge for user 605. Accordingly, DCS 607 may determine whether that conference bridge is available for use when user 605 initiates a request for a conference call. In one embodiment, if the bridge is available, DCS 607 collects the bridge identification number for user 605's designated bridge and adds the number to a generated CBA message that further includes the contact information for the target participant users designated by user 605 and the caller ID related conference information that is to be used when contacting the participant users. On the other hand, if the designated bridge is not available, or user 605 does not have a designated bridge, DCS 607 may search for and temporarily assign a conference bridge to user 605 for the duration of the conference call requested by user 605. In one embodiment, DCS 607 may search a pool of conference bridges maintained in a database for an available bridge that may be used to facilitate the requested conference call.

Once an available conference bridge (e.g., conference bridge 630) is identified, DCS 607 collects and adds a bridge identification number corresponding to the available bridge to the CBA message (Step 950). DCS 607 then sends the CBA message to CBA server 610 (Step 960). Once received, CBA server 610 extracts the contact information, the caller ID related conference information, and the bridge identification number from the CBA message and creates a CBA bridge message in a manner consistent with the process described in connection with Step 770 of FIG. 7 (Step 970). CBA server 610 then sends the CBA bridge message to the available conference bridge 630, which uses commands included in the CBA bridge message to set up the conference call requested by user 605 in a manner consistent with the processes previously described in connection with Steps 780 and 790 of FIG. 7 (Step 980).

Accordingly, methods and systems consistent with certain exemplary embodiments enable user 605 to set up a conference call to take place immediately following the time when user 650 initiates the call request. These embodiments allow user 605 to select participant users 645-1 to 645-N and allow system 600 to automatically configure and establish the conference call at the time user 605 requests a conference call with the selected participant users.

As described above, exemplary embodiments may allow for prescheduled and on the fly conferencing using advanced communication features, including conference transcription services, implemented, for example, as described above. All or part of the systems and methods consistent with exemplary embodiments described above may be implemented as instructions stored on or read from computer-readable media, such as secondary storage devices (e.g., hard disks, floppy disks, optical disks, semiconductor storage), a carrier wave received from a network such as the Internet, or other forms of volatile or non-volatile memory, as is well known.

While exemplary embodiments have been described herein, it will be readily apparent that many modifications may be made thereto, and additional embodiments implemented, without departing from the scope of the invention as set forth in the appended claims. Accordingly, embodiments of the invention are not limited to the above described embodiments and examples, but instead is defined by the appended claims in light of their full scope of equivalents. The specification and drawings are accordingly to be regarded in an illustrative rather than restrictive sense.

That which is claimed:

1. A method comprising:
    detecting a conference call event previously configured by a subscriber user that indicates when a conference call should be established between the subscriber user and participant users;
    collecting contact information for the participant users;
    collecting customized conference information to be displayed in caller identification (ID) fields that are sent out when the participant users are contacted for the conference call, wherein the customized conference information to be displayed in the caller ID fields comprises information that is entered or selected by the subscriber user and wherein the customized conference information comprises information describing the conference call; and
    providing a message including the contact information and the customized conference information to a conference server that is configured to instruct a bridge to establish the conference call between the users by calling the participant users using the contact information and the customized conference information included in the message.

2. The method of claim 1, wherein the information is entered or selected by the subscriber user when the subscriber user configures the conference call event.

3. The method of claim 1, wherein the customized conference information to be displayed in the caller ID fields comprises at least one of:
    information identifying the fact that the incoming call is a conference call;
    information identifying a subject of the conference call; and
    information identifying the subscriber user who configured the conference call.

4. The method of claim 1, wherein providing a message comprises:
    generating the message using the collected contact information and the collected customized conference information and instructions associated with a date for commencing the conference call; and
    using the message by the conference server to generate a second message for instructing the bridge to establish the conference call.

5. The method of claim 1, comprising receiving a response message from the conference server including information associated with the conference call and at least one participant user.

6. The method of claim 5, wherein the response message comprises at least one of:
    information stating that at least one participant user is declining the call;
    information stating that at least one participant user is not answering the call;
    information stating that at least one participant user is accepting the call; and
    information stating that none of the participant users is answering the call.

7. The method of claim 1, wherein detecting a conference call event comprises scanning a calendar application to determine whether the subscriber user has scheduled a conference call.

8. The method of claim 7, wherein collecting customized contact information for the participant users comprises:
- determining the participant users from the calendar application; and
- accessing an address book that contains the contact information for the participant users.

9. A system comprising:
- a conference bridge; and
- a service system coupled to the conference bridge, the service system comprising a first subsystem and a second subsystem, wherein the first subsystem is configured to:
- detect a conference call event previously configured by a subscriber user that indicates when a conference call should be established between the subscriber user and participant users,
- collect contact information for the participant users,
- collect customized conference information to be displayed in caller identification (ID) fields that are sent out when the participant users are contacted for the conference call, wherein the customized conference information to be displayed in the caller ID fields comprises information that is entered or selected by the subscriber user and wherein the customized conference information comprises information describing the conference call, and
- provide a message including the contact information and the customized conference information to the second subsystem, and wherein the second subsystem is configured to instruct the conference bridge to establish the conference call between the participant users by calling the participant users using the customized contact information and the customized conference information included in the message.

10. The system of claim 9, wherein the information is entered or selected by the subscriber user when the subscriber user configures the conference call event.

11. The system of claim 9, wherein the customized conference information to be displayed in the caller ID fields comprises at least one of:
- information identifying the fact that the incoming call is a conference call;
- information identifying a subject of the conference call; and
- information identifying the subscriber user who configured the conference call.

12. The system of claim 9, wherein the first subsystem is further configured to provide the message by using at least one of the collected contact information, the collected customized conference information and instructions associated with a date for commencing the conference call to generate the message;
- wherein the message is used by the second subsystem to generate a second message for instructing the conference bridge to establish the conference call.

13. The system of claim 9, wherein the first subsystem is further configured to receive a response message from the second subsystem including information associated with the conference call and at least one participant user.

14. The system of claim 13, wherein the response message comprises at least one of:
- information stating that at feast one participant user is declining the call;
- information stating that at least one participant user is not answering the call;
- information stating that at least one participant user is accepting the call; and
- information stating that none of the participant users is answering the call.

15. The system of claim 9, wherein the first subsystem includes a calendar facility, and the first subsystem is configured to scan the calendar application in order to detect the conference call event.

16. The system of claim 15, wherein the first subsystem includes an address book facility, and wherein the first subsystem is configured to collect customized contact information for the participant users by determining the participant users from the calendar application, and accessing the address book facility that contains the contact information for the participant users.

17. A system comprising:
- a first server system configured to detect a conference call event previously configured by a subscriber user and generate a first message based on the event, wherein the first message comprises telephone numbers for a plurality of participant users identified by the subscriber user and customized conference information to be displayed in caller identification (ID) fields that are sent out when the participant users are contacted for the conference call, wherein the customized conference information to be displayed in the caller ID fields comprises information that is entered or selected by the subscriber user and wherein the customized conference information comprises information describing the conference call;
- a second server system coupled to the first server system and configured to receive the first message from the first server system and generate a second message based on the first message, wherein the second message comprises instructions for configuring a conference call using the telephone numbers and the customized conference information; and
- a conference bridge coupled to the second server system and configured to receive the second message, extract the telephone numbers and the customized conference information from the second message, insert the customized conference information into the caller ID fields that are sent out when the bridge dials the participant users, call the participant users using the telephone numbers, and
- establish a conference call between the participant users and the subscriber user;
- wherein the subscriber user accesses the first server system to schedule conference calls for future dates and the first server system, second server system, and conference bridge automatically attempt to establish the conference calls when the future dates arrive.

* * * * *